T. Rhoads.
Propelling Vehicles.
Nº 76814. Patented Apr. 14, 1868.
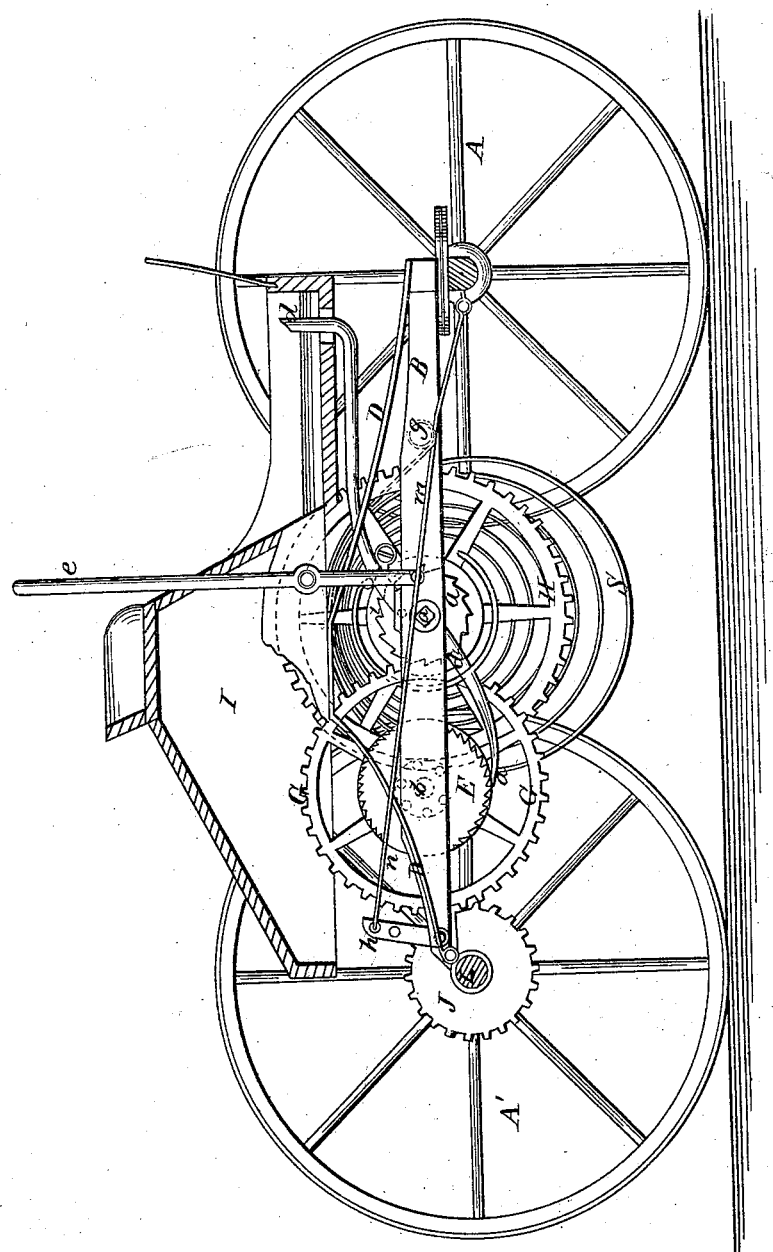
Witnesses:
W. C. Ashkettle
J. Fraser
Inventor:
T. Rhoads
per Munn & Co.
Attorneys

United States Patent Office.

THOMAS RHOADS, OF FISKILWA, ILLINOIS.

Letters Patent No. 76,814, dated April 14, 1868.

---

IMPROVEMENT IN PROPELLING VEHICLES.

---

The Schedule referred to in these Letters Patent and making part of the same.

---

TO ALL WHOM IT MAY CONCERN:

Be it known that I, THOMAS RHOADS, of Fiskilwa, in the county of Bureau, and State of Illinois, have invented new and useful Improvements in Propelling Vehicles; and I do hereby declare that the following is a full, clear, and exact description thereof, which will enable those skilled in the art to make and use the same, reference being had to the accompanying drawings, forming part of this specification, in which—

The drawing represents a side view of my improvements attached to a buggy, with part of the body of the same broken away to expose the mechanism.

This invention relates to the propelling of vehicles for practical use, and consists of the spring and wheel-work mechanism attached thereto, as will be set forth in the following.

In the accompanying plate of drawings—

A A' are the wheels.

The wheels A are mounted upon the axle in the usual way.

B is the frame connecting the axles and supporting the propelling-mechanism.

The propelling power is derived from the spring S, which is affixed to a cross-rod in the frame, as indicated at $g$.

The other end of this spring is attached to the shaft of the wheel H, in the usual manner.

The wheel H engages with the pinion $b$, on the shaft of the wheel G.

The wheel G engages with a toothed wheel, J, which latter is keyed on the shaft L.

The wheels A' are the driving-wheels, and are keyed on or otherwise rigidly affixed to the shaft L; whereby the motion of the spring S will be communicated to this shaft, through the wheel H, pinion $b$, wheel G, and wheel J, as shown.

The front axle is provided with a king-bolt and fifth-wheel, in the usual manner, and is also connected with the lever $e$, by the rod $m$, as shown, the said lever being connected with a pawl, $h$, by a rod, $n$, by which the pawl is brought to catch upon the teeth of the ratchet-drum E, when the lever $e$ is pushed back to the extent of its vibration.

The ratchet-drum E is serrated on one edge only, the remainder of its periphery being left smooth for the action of the brake-lever $d$, by which the forward motion of the vehicle is retarded or stopped, and, when so stopped, the pawl $h$ is brought to catch in the ratchet-teeth of the drum, as aforesaid, whereby the mechanism is held at rest.

The brake $d$ projects up into the front part of the body of the vehicle, as shown, where it is convenient for applying the foot.

The lever $e$ is pivoted to the side of the body I, and is operated by hand.

The body I is supported by the spring D, in the usual manner.

The brake-lever $d$ is pivoted to the frame B.

The head $o$ of the shaft of the ratchet-wheel $a$ is the point where the crank or wrench is applied to wind up the spring.

By this invention, vehicles may be propelled on common roads, with more or less speed, according to the level or uneven character of the road.

Its advantage, in dispensing with the use of horses, is obvious.

I claim as new, and desire to secure by Letters Patent—

1. The arrangement, with relation to the revolving shaft L, carrying the wheels A', of the wheels G H J, pinion $b$, and spring S, as herein described, for the purpose specified.

2. The pawl $h$, pivoted to the frame D, when connected to the lower end of the pivoted lever $e$, whereby it is made to engage with the ratchet-drum E, when said lever is drawn back to the extent of its vibration, as herein described, for the purpose specified.

3. The brake-lever $d$, in combination with the ratchet-drum E, pivoted lever $e$, and pawl $h$, as herein described, for the purpose specified.

4. The combination and arrangement of the gearing, G H J, pinion $b$, spring S, ratchet-drum E, lever $e$, pawl $h$, brake $d$, all operating as described, for the purpose specified.

THOMAS RHOADS.

Witnesses:
 JAMES GARDNER,
 DAVID REIGEL.